H. M. LOOMER.
GRINDING MACHINE.
APPLICATION FILED DEC. 11, 1916.

1,308,088. Patented July 1, 1919.

INVENTOR.
Henry M. Loomer

UNITED STATES PATENT OFFICE.

HENRY M. LOOMER, OF BEVERLY, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

GRINDING-MACHINE.

1,308,088.     Specification of Letters Patent.     Patented July 1, 1919.

Application filed December 11, 1916. Serial No. 136,223.

*To all whom it may concern:*

Be it known that I, HENRY M. LOOMER, a citizen of the United States, residing at Beverly, in the county of Essex and State of Massachusetts, have invented certain Improvements in Grinding-Machines, of which the following description, in connection with the accompanying drawings, is a specification, like reference characters on the drawings indicating like parts in the several figures.

This invention relates to a machine of general utility for grinding or sharpening the teeth of rotary forepart or shank cutters such as are used in trimming the edges of boot and shoe soles in the process of manufacture, and is more especially concerned with a machine construction and arrangement which is of particular utility for grinding rotary cutters, the teeth of which are ground at an angle to the axis of the cutter.

One form of rotary cutter of this general type is disclosed in Latham Patent No. 1,104,910 of July 28, 1914, and consists of a circular head having a plurality of teeth arranged in circumferential series with the front face of each tooth lying in a plane tangent to the surface of a cone extending co-axially through the cutter with its base at the larger end of the cutter and with the cutting edge of each tooth comprising portions lying at different radial distances from the axis of the cutter. The front faces of these teeth must be ground to sharpen the cutting edges of the head and must be properly positioned and held relatively to the grinder in order to secure satisfactory results.

One feature of my invention consists in the combination of a grinding wheel, a cutter carrying member guided for straight line reciprocating movement, toward and from the grinding wheel, and a cutter holder connected to said member for universal adjustment relatively to and about the longitudinal axis of said member.

This construction enables the cutter holder to be adjusted to that angle to the axis of the spindle which will position the face of a tooth of the cutter parallel with the side face of a grinding wheel under all conditions of inclination of cutter teeth faces and of grinder faces. The tooth can, therefore, be positioned at the proper angle for uniform engagement with the grinder face while the carrying member is reciprocated to draw the tooth face across the face of the grinding wheel.

A further feature of the invention consists in the combination of a grinding wheel, a cutter carrying member, means for supporting and guiding said member for straight line movement toward and from the grinding wheel, a cutter holder carried by and angularly adjustable with respect to the longitudinal axis of said member and having a bearing to receive and journal a rotary cutter head for turning adjustment to present the faces of successive teeth to the active face of the grinding wheel and means normally tending to position said carrying member at one extreme of its straight line movement.

The relation of the carrying member and grinding wheel permits the cutter head to be drawn across the grinding wheel at such an angle that at the point of maximum contact, the face of the wheel will engage substantially the entire surface of the tooth face to be ground, the angular adjustment of the cutter holder being such that the line of movement of the holder and spindle brings the tooth face uniformly against the grinding face of the wheel.

In order to secure the most effective grinding action, it is desirable that the cutter be determinately positioned with the faces of its teeth at the point of maximum surface contact with the grinder. An additional feature of the invention, accordingly, consists in an adjustable stop to arrest movement of the spindle with the cutter tooth in the position of maximum grinding surface contact.

A further feature of the invention consists in the combination with a carrying member having cutter holding means thereon, means to support and guide the carrying member for straight line reciprocating movement toward and from a grinding wheel, of a spring normally operative to position the cutter-carrying member at one extremity of its straight line movement. The spring in coöperation with the guiding means is utilized normally to position the cutter holder and cutter above its position of contact with the grinding wheel and to return it to such position after it has been manually moved downwardly to grinder contacting position and the pressure subsequently removed.

The guiding means in the construction shown provides a uniform line of movement for the spindle by guiding it vertically and holding it against axial turning movement so that the operator need only hold the face of a cutter tooth against the grinding face and move the spindle to traverse the wheel face with the cutter tooth.

Another feature of the invention consists in the combination of a frame, a grinding wheel supported by the frame, an arm connected to the frame and adjustable toward and from the grinding wheel, a cutter holding spindle, and detachable interlocking plug and socket connections between said spindle and the arm of the grinding wheel frame. The detachable interlocking plug and socket connection,—in the present instance, a bayonet joint,—facilitate the connection and disconnection of the grinder attachment, so that the same grinding wheel with its frame and bracket arm may have a plurality of attachments.

These and other features of the invention will be clearly seen from the following detailed specification read in connection with the accompanying drawings, in which—

Figure 1:
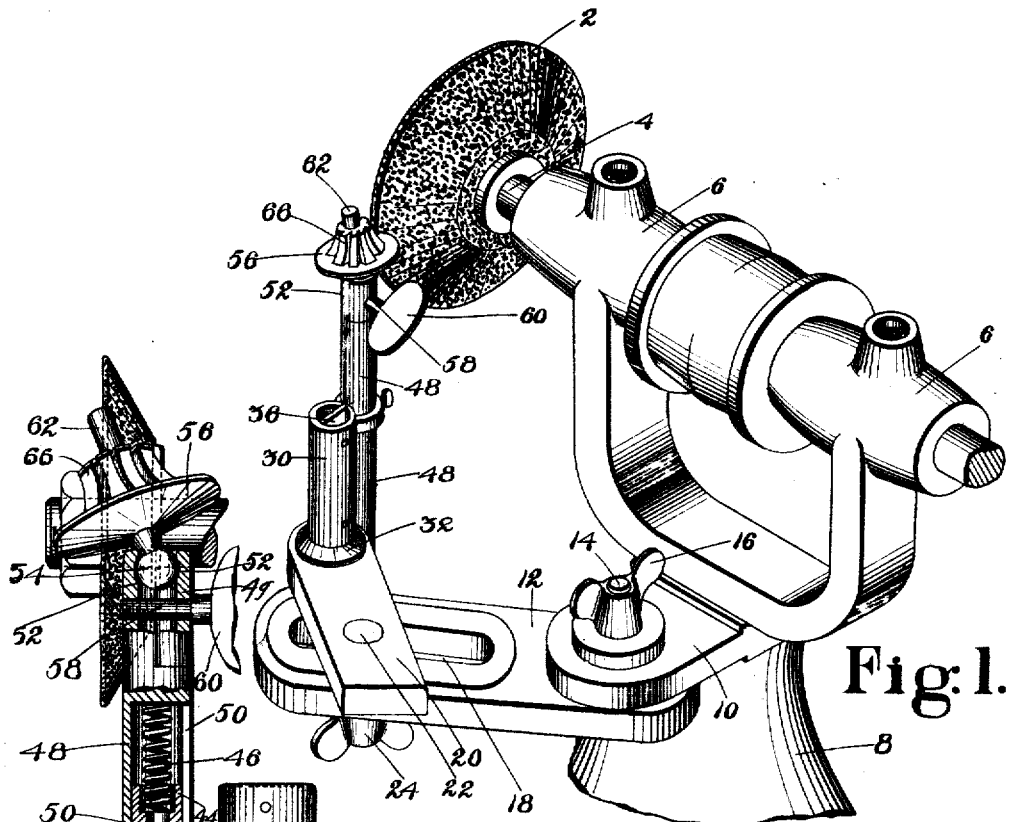
Figure 1 is a perspective view of a grinding mechanism embodying the present invention.

The attachment forming the subject-matter of the invention is one that may be advantageously employed in combination with a standard form of grinder and frame, such as a grinding wheel 2 mounted on a rotary shaft 4 which is journaled in a head 6 supported from the base 8 by an upstanding yoke. The shaft may be rotated by means of the usual driving pulley. A lug 10 offset from the frame has one end of the bracket arm 12 pivotally secured thereto by means of the usual bolt 14 and wing nut 16. This arm, adjacent to its other end, is formed with an elongated slot 18, through which extends a clamping bolt 22 depending from a second bracket arm 20 which is clamped in adjusted position on the arm 12 and relatively to the slot 18 by means of the wing nut 24 engaging the end of the bolt 22 below arm 12. One end of arm 20 is provided with a depending sleeve 26 rigidly secured to the arm and having adjacent to its lower end an internal pin 28.

A cutter support and guide may be detachably secured to the arm 20 by what may be termed a plug and socket connection. In the present instance, a sleeve 30, provided intermediate its ends with a supporting flange 32, and at its lower edge with a bayonet slot 34, is inserted into the depending sleeve 26 from above, its bayonet slot coöperating with the pin 28 to provide a bayonet joint lock, so that the sleeve 30 is plugged into the socket formed by the depending sleeve 26 and is locked in that relation by the bayonet joint with its flange 32 resting upon the upper surface of the arm 20.

The sleeve 30 acts as a base or support for cutter supporting and guiding means and at a point above the arm 20, is formed with a longitudinal slot through which a plate 36 extends into the interior of the sleeve and is rigidly secured thereto by pins or other suitable means. This plate is provided with a laterally offset portion 38 having a depending tongue 40 spaced from the edge of the arm 20 to clear the arm. This lateral offset extends through a longitudinal slot 42 in a supporting sleeve 44 and is rigidly secured to this sleeve by suitable pins or rivets.

The upper end of the sleeve is enlarged in diameter to provide an annular shoulder forming a seat for the lower end of a coiled spring 46 whose upper end abuts against the upper end of a socket formed in a cutter-carrying member or spindle 48 mounted and guided upon the sleeve 44 for vertical sliding movement and guided for straight line movement by means of an elongated vertical slot 50, whose sides bear upon the sides of the offset plate 38.

Figures 2, 3:
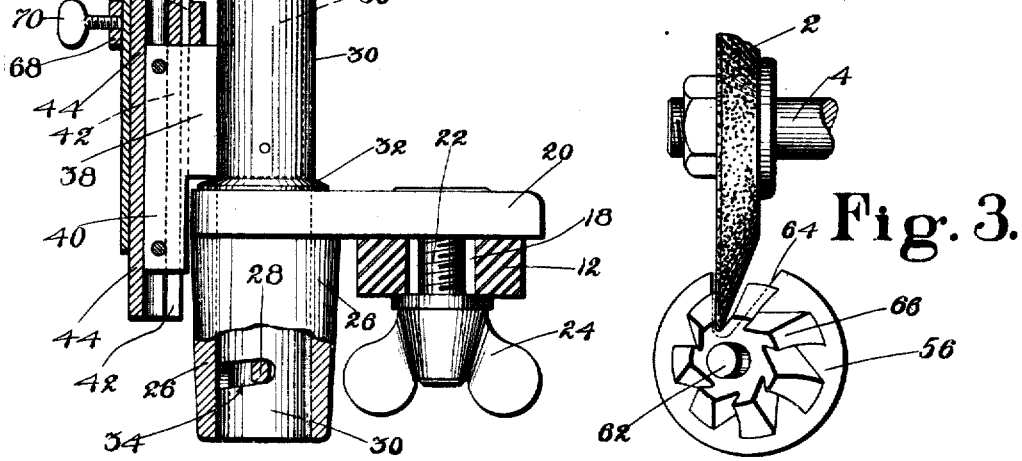
Fig. 2 is a vertical section on an enlarged scale through the cutter holding spindle and its guiding means.
Fig. 3 is a fragmentary top plan view of the cutter holder, cutter and grinding wheel in coöperative grinding position.

The upper end of the spindle above the abutment point for the spring 46, is hollowed and split to provide complemental sections, one of which, seen best at 49, in Fig. 2, is bodily removable, cupped recesses being formed at diametrically opposite points at the upper ends of the fixed and removable sections to provide bearings for the spherical lower end 54 of a stem depending from a cutter supporting plate 56.

This plate is arranged to be adjusted angularly relatively to the axis of the spindle 48 by clamping the spherical end 54 of its depending stem in the socket 52 formed in the split upper end of the spindle. A shouldered clamping screw 58 has a smooth bearing in the removable section 49 and is threaded into the opposite side of the fixed section, so that manipulation of the finger piece 60 of the screw operates to clamp the lower end of the stem of the cutter holding plate in the socket at the upper end of the spindle with the plate and the supported cutter positioned at the desired angle relatively to the axis of the spindle.

The upper face of the plate 56 is preferably flat and is provided with a pin 62 upstanding substantially perpendicularly therefrom, and with a clearance notch 64 in one edge to permit the grinding wheel, whose edge face should be relatively narrow, to extend therein to substantially the bases of the cutter teeth. The diameter of the pin 62 corresponds with the diameter of the bore of rotary cutters of the type previously referred to, so that a rotary cutter such as shown at 66, may be seated on the plate 56 and over its pin 62 and may be turned by hand about the pin to present the faces of successive cutter teeth to the grinding wheel.

Manifestly, the arm 20 is positioned on the arm 12, and the latter is arranged at that angle to the grinding wheel frame to permit movement of the cutter carrying spindle 48 in a line toward and from the grinding wheel 2. The coiled spring 46 operates normally to elevate the spindle 48 so as to position the cutter 66 at a point above its position of contact with the grinding wheel, the cutter holding plate 56 being adjusted angularly relatively to the longitudinal axis of the spindle 48, so as to bring the face of the tooth to be ground uniformly against the flat face of the grinding wheel, as suggested in Figs. 2 and 3 of the drawings. The proper position of the cutter holding plate may be determined by depressing the spindle 48 and swinging the cutter holding plate until the face of a cutting tooth on the cutter uniformly engages the side of the grinding wheel with substantially the entire face of the tooth in contact with the face of the grinding wheel.

It is desirable determinately to position the cutter with the face of its cutting teeth in maximum surface contact with the face of the grinding wheel, and, accordingly, an abutment ring 68 is mounted upon the spindle 48 and is adjustably secured thereto by a set screw. This set screw may be loosened when the cutter holding plate is adjusted as described and when the adjustment and maximum surface contact is secured, the set screw may be tightened. The ring will drop by gravity to rest upon the upper edge of the offset plate 38, so that once the angle and maximum surface contact of the cutter tooth is secured, the operator may maintain the position of the cutter with one hand, and tighten the clamping screw 58 and set screw 70 with the other.

The operation of the device in grinding the cutter should be obvious from the foregoing and need not be further explained in detail. The operator, after making the necessary adjustments as described, merely depresses the spindle 48 against the action of the spring 46, grasping the cutter 66 at opposite sides with the thumb and forefinger and pressing the face of the tooth to be ground against the side of the grinder as the cutter traverses the edge of the grinding wheel. The compressed spring 46 acts to return the spindle for a second reciprocation, the operator maintaining the face of the tooth against the face of the grinding wheel as the spindle moves downwardly and upwardly. When the face of one tooth has been sufficiently ground, the cutter is merely rotated on the pin 62 to bring the face of the next adjacent tooth against the grinding wheel and the operation is repeated. If it is desired to use the grinding wheel to grind other types of cutters, the sleeve 30 with the attached spindle, cutter holder and cutter may be removed bodily from the arm 20 by turning the sleeve 30 to release the bayonet lock.

Having thus described my invention, what I claim as new and desire to secure by Letters Patent of the United States is:—

1. A device of the class described having, in combination a grinding wheel, a carrying member guided for straight line reciprocating movement toward and from the grinding wheel and a cutter holder having a connection with said carrying member for universal adjustment relatively to and about the longitudinal axis of the carrying member.

2. A device of the class described having, in combination, a grinding wheel, a carrying member for a rotary cutter guided for straight line reciprocating movement in the general direction of the axis of the cutter toward and from the grinding wheel, a cutter holder carried by and angularly adjustable relatively to the axis of the carrying member and arranged to receive and journal the cutter for turning movement, and means normally effective to position said member at one extreme of its straight line movement.

3. A device of the class described having, in combination, a grinding wheel, a carrying member, mounted for reciprocation toward and from the grinding wheel, a cutter holder having a connection with one end of said carrying member for universal adjustment of the holder relatively to and about the longitudinal axis of the carrying member and having a bearing to support a rotary cutter for turning movement, and a support for said carrying member having a plurality of guiding members extending substantially parallel to each other and arranged to guide said carrying member and cutter for straight line movement.

4. A device of the class described having, in combination, a hollow spindle, a cutter holder having a connection with one end of the spindle for universal angular adjustment of the holder relatively to the longitudinal axis of the spindle, a supporting bracket, and connections from said bracket to said spindle including a guide rod seated within said hollow spindle and a second and parallel guide member cooperating with the spindle to maintain it against axial turning movement and to guide it for straight line movement.

5. Grinding mechanism comprising a frame, a grinding wheel thereon, a carrying member, means connected to the frame and arranged to support and guide said member for straight line reciprocating movement toward and from the grinding wheel, and a cutter holder carried by said member and mounted for angular adjustment relatively to the longitudinal axis of said member and having a bearing to receive and journal a rotary cutter head for turning movement to present the faces of successive teeth to the active face of the grinding wheel.

6. Grinding mechanism comprising a frame, a grinding wheel thereon, an arm connected to the frame, a carrying member, means detachably connected to the arm and cooperating with said member to support and guide said member for straight line reciprocating movement toward and from the grinding wheel, and a cutter holder connected to one end of said member for universal angular adjustment relatively to the longitudinal axis of said member and having a bearing to receive and journal a rotary cutter for turning movement to present the faces of successive teeth to the active face of the grinding wheel.

7. Grinding mechanism comprising a grinding wheel, a carrying member mounted for straight line reciprocating movement toward and from the periphery of the grinding wheel, a cutter holder carried by and angularly adjustable with respect to the longitudinal axis of the carrying member to position the faces of teeth of a supported cutter for engagement with the grinding wheel, and an adjustable stop to arrest straight line movement of the carrying member in one direction with a cutter tooth in the position of maximum grinding surface contact.

8. Grinding mechanism comprising a grinding wheel, a spindle, a cutter holder carried by one end of the spindle for angular adjustment relatively to the axis of the spindle, means to support and guide the spindle for straight line reciprocating movement toward and from the periphery of the grinding wheel, and a stop member adjustably carried by the spindle to engage said supporting and guiding means to arrest movement of a cutter on the holder with its teeth in the position of maximum grinding surface contact.

9. A device of the class described having, in combination, a grinding wheel, a member guided for vertical reciprocating movement toward and from the grinding wheel, a cutter holder connected to said member for angular adjustment relatively to the longitudinal axis of said member and having a bearing to support the cutter for turning movement, and means normally effective to position said member with the cutter thereon above its position of contact with the grinding wheel.

10. A device of the class described having, in combination, a grinding wheel, a spindle guided for vertical reciprocating movement toward and from the grinding wheel, a cutter holder connected to the upper end of said spindle for angular adjustment relatively to the longitudinal axis of the spindle and having a bearing to support the cutter for turning adjustment, and means normally tending to position the spindle at the upper extremity of its vertical movement and with the cutter above its position of contact with the grinding wheel.

11. A device for grinding cutters provided with axial openings having, in combination, a spindle having means arranged to enter a cutter opening and about which said cutter is freely rotatable by the operator, means to support and guide the spindle for straight line reciprocating movement, and a spring normally operative to position said spindle at one extremity of its straight line movement.

12. Grinding mechanism comprising a grinding wheel, a hollow spindle having cutter holding means at one end, means extending within the spindle to support and guide said spindle for straight line movement in a path substantially tangential to the grinding wheel, and a spring operating against said spindle and normally effective to position its cutter holding end out of contact with the grinding wheel.

13. A device of the class described having, in combination, a frame, a grinding wheel mounted on the frame, a hollow spindle mounted for reciprocating movement toward and from the grinding wheel and having a cutter holder secured to one end for adjustment angularly with respect to the longitudinal axis of the spindle and having a longitudinally extending guide slot, an arm connected to the frame, spindle supporting and guiding means connected to the arm including a rod seating in the hollow spindle and a rigidly attached plate extending radially outward through the guide slot in said spindle, and a spring operating between said rod and spindle and normally effective to position the cutter holding end of the spindle beyond the active face of the grinding wheel.

14. Grinding mechanism having, in combination, a frame, a grinding wheel mounted on the frame, an arm connected to the frame and adjustable toward and from the grinding wheel, a cutter holding spindle, and means detachably connecting said spindle and arm by interlocking plug and socket connections.

15. Grinding mechanism having, in combination, a frame, a grinding wheel mounted on the frame, an arm connected to the frame and adjustable toward and from the grinding wheel, a spindle having cutter holding means at one end, means to support and guide said spindle for movement toward and from the grinding wheel, and a bayonet joint connection between said supporting and guiding means and said arm.

16. In a grinding machine, the combination of a spindle, and a cutter holder secured to said spindle for angular adjustment relatively to the axis of the spindle and having a flat-surfaced base with an upstanding pin fixed therein to receive and journal a cutter to rotate about said pin.

17. In a grinding machine, the combination of a spindle mounted to move longitudinally of its axis and a cutter holder carried by said spindle, with ball and socket connections between the spindle and holder effective angularly to adjust the holder relative to the longitudinal axis of the spindle.

18. In a grinding machine, the combination of a spindle having a sectional socketed end, and a cutter holder having a substantially spherical end adjustably clamped in said socketed spindle end and having a flat surfaced base with an upstanding fixed pin to receive and rotatably retain a cutter.

19. In a grinding machine, a cutter holder having a cutter supporting plate with an upstanding cutter receiving pin and a grinder entrance notch in one edge and having a depending substantially spherical base.

20. In a grinding machine, the combination of a grinding wheel, a spindle mounted for movement toward and from the grinding wheel, a cutter holder connected to said spindle for angular adjustment laterally with respect to its longitudinal axis and having a cutter supporting surface extending transversely to the direction of movement of the spindle.

21. In a grinding machine, the combination of a grinding wheel, a cutter carrying member mounted for reciprocating movement toward and from the periphery of said wheel, and a cutter holder connected to one end of said member for angular adjustment laterally with respect to the line of reciprocating movement of said member and having a cutter supporting plate extending transversely to the direction of reciprocating movement of said member.

22. A cutter grinding machine comprising a grinding wheel, a supporting member adjustable toward and from the wheel, a cutter carrier, and interlocking means for detachably connecting the supporting member and carrier.

In testimony whereof I have signed my name to this specification.

HENRY M. LOOMER.

Copies of this patent may be obtained for five cents each, by addressing the "Commissioner of Patents, Washington, D. C."